UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

ELECTRODE.

1,050,019. Specification of Letters Patent. Patented Jan. 7, 1913.

No Drawing. Original application filed July 9, 1910, Serial No. 571,105. Divided and this application filed May 1, 1912. Serial No. 694,513.

*To all whom it may concern:*

Be it known that I, JOSEPH L. R. HAYDEN, a citizen of the United States, residing at Schenectady, county of Schenectady, State of New York, have invented certain new and useful Improvements in Electrodes, of which the following is a specification.

My invention has reference to an electrode of the flaming type. In lamps in which electrodes of this character are used, practically all the light is emitted from the arc itself as distinguished from the incandescent tip or tips of one or both of the electrodes, as is the case when simple carbon electrodes are used.

In a former application, Serial No. 571,105, filed July 9, 1910, of which the present application is a division, I have pointed out that while the titanium arc is white and efficient, it is in general unsteady and that its operation is greatly improved by the use of a fluorin compound and that the fluorin may be introduced into the electrode as an element of a compound in which not only a metal, other than titanium, is present, but in which titanium itself is also present, as in that case a larger amount of fluorin relative to the metal, other than titanium, may be introduced, than would otherwise be possible. It was also pointed out that calcium titano-fluorid ($CaTiF_6$), and cerium titano-fluorid ($CeTiF_6$), were particularly valuable electrode constituents; the calcium titano-fluorid being used for a yellow light and cerium titano-fluorid for a white light.

My present application has reference to that part of the invention set forth but not claimed in my aforesaid prior application which is directed to the use of calcium titano-fluorid in a flaming electrode in which metallic compounds other than the calcium titano-fluorid may or may not be present.

I have made an excellent electrode by thoroughly admixing 40 per cent. of calcium titano-fluorid with 60 per cent. carbon and mixing with this a binding material and then squirting the mixture and baking the resulting electrodes in the usual manner. My invention is equally applicable, however, to an electrode in which other constituents are present. For example, when a yellow flame electrode is desired a certain amount of calcium fluorid may be used to increase the efficiency of the electrode, and I have made an excellent electrode by using calcium titano-fluorid 30 per cent.; calcium fluorid 10 per cent. and carbon 60 per cent, and making an electrode therefrom in the manner above indicated. Furthermore, for operation under other conditions, particularly when a white light is desired, a certain amount of either titanium carbid or metallic titanium may be advantageously admixed with calcium titano-fluorid and carbon. I have, for example, made a good electrode by mixing calcium titano-fluorid 30 per cent., titanium carbid 10 per cent. and carbon 60 per cent.

It will be understood that steadying materials, such as alkaline compounds, may be also used if desired.

What I claim as new and desire to secure by Letters Patent of the United States, is,—

1. An electrode, the principal light-giving constituent of which is calcium titano-fluorid.

2. A flaming electrode composed mainly of calcium titano-fluorid and carbon.

3. An electrode composed of a mixture of calcium titano-fluorid and carbon.

In witness whereof, I have hereunto set my hand this 30th day of April, 1912.

JOSEPH L. R. HAYDEN.

Witnesses:
BENJAMIN B. HULL,
HELEN ORFORD.